Patented June 27, 1939

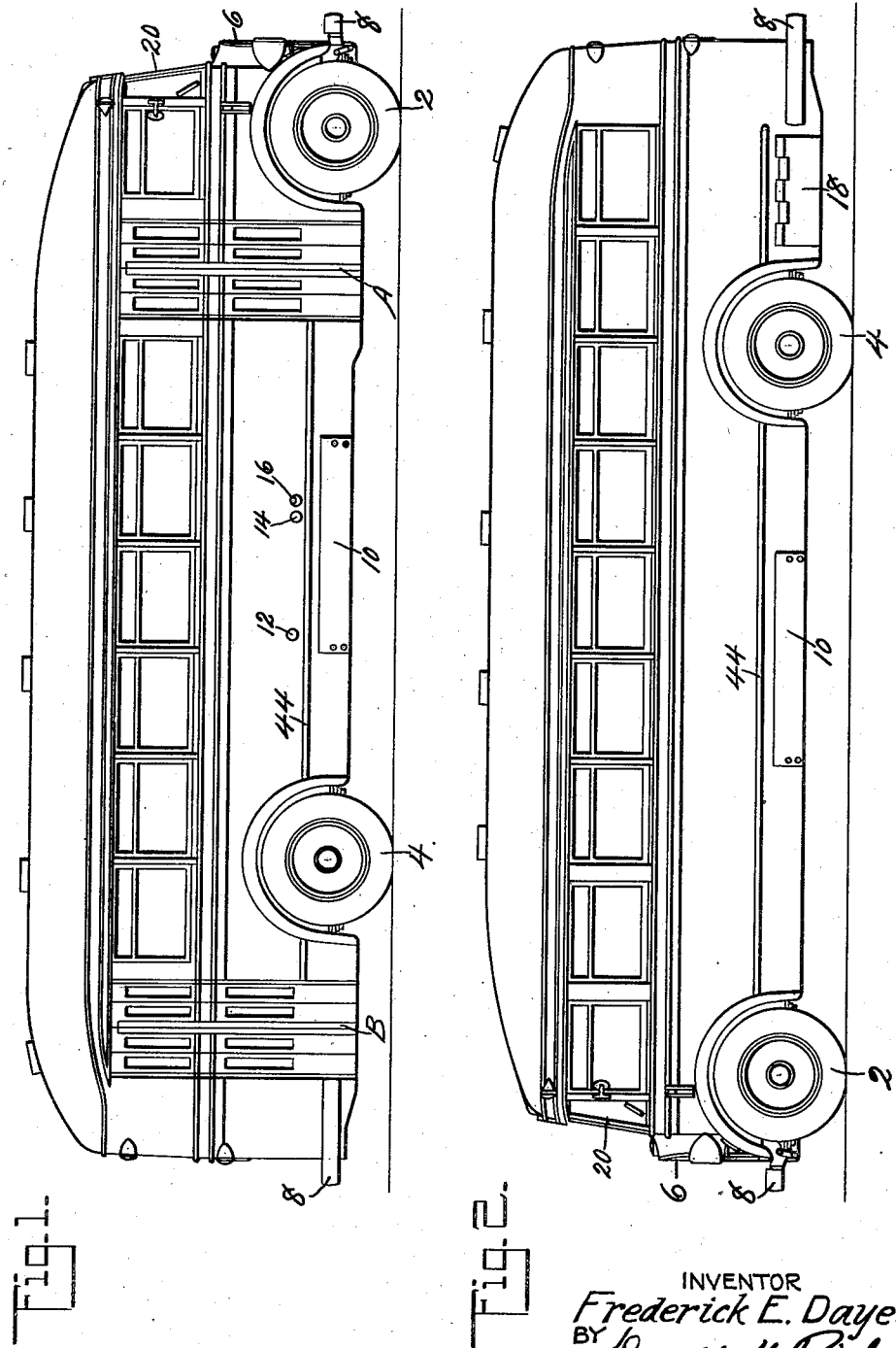
June 27, 1939.   F. E. DAYES   2,163,748
MOTOR VEHICLE
Filed Feb. 21, 1935   5 Sheets-Sheet 1
INVENTOR
Frederick E. Dayes
BY
ATTORNEY

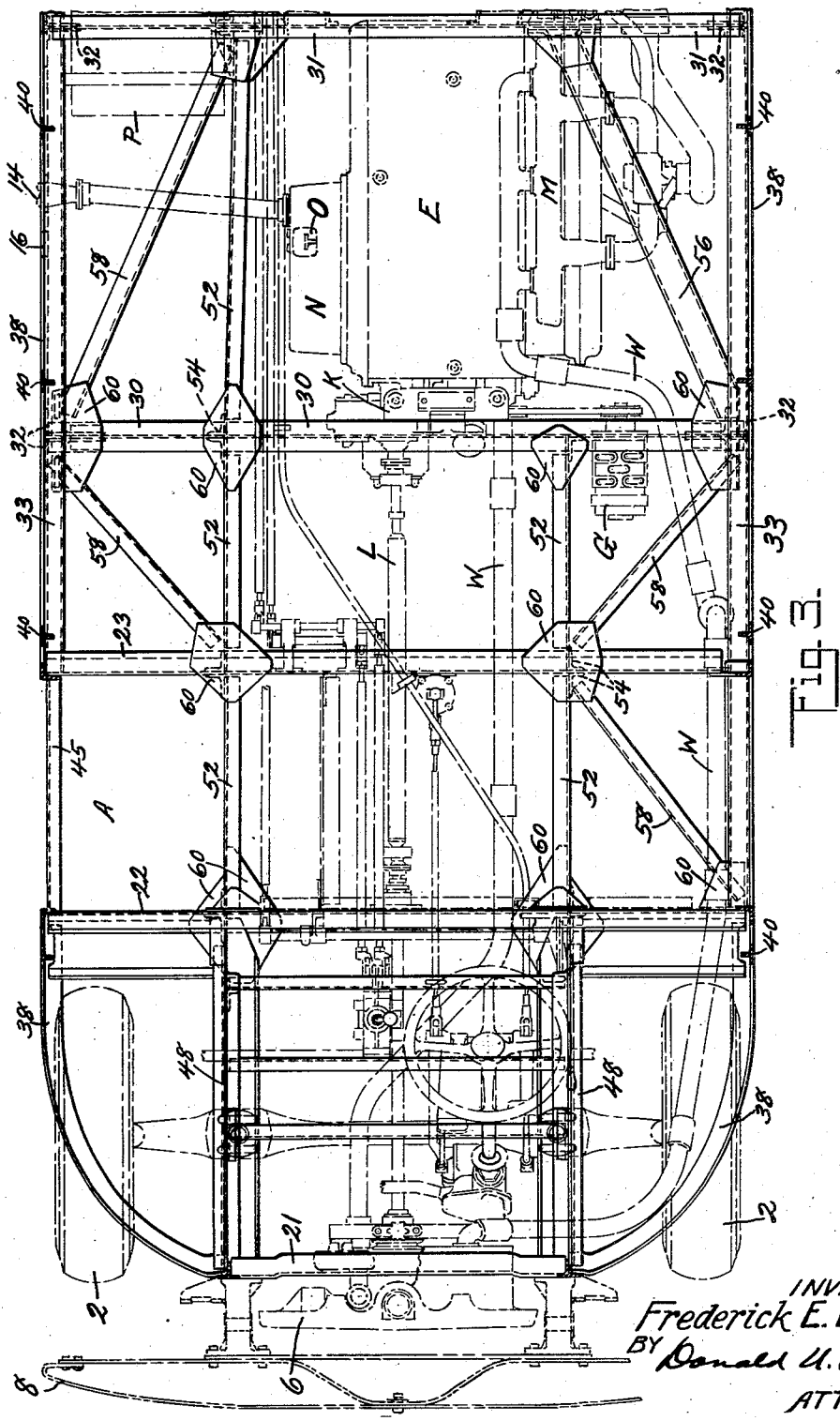

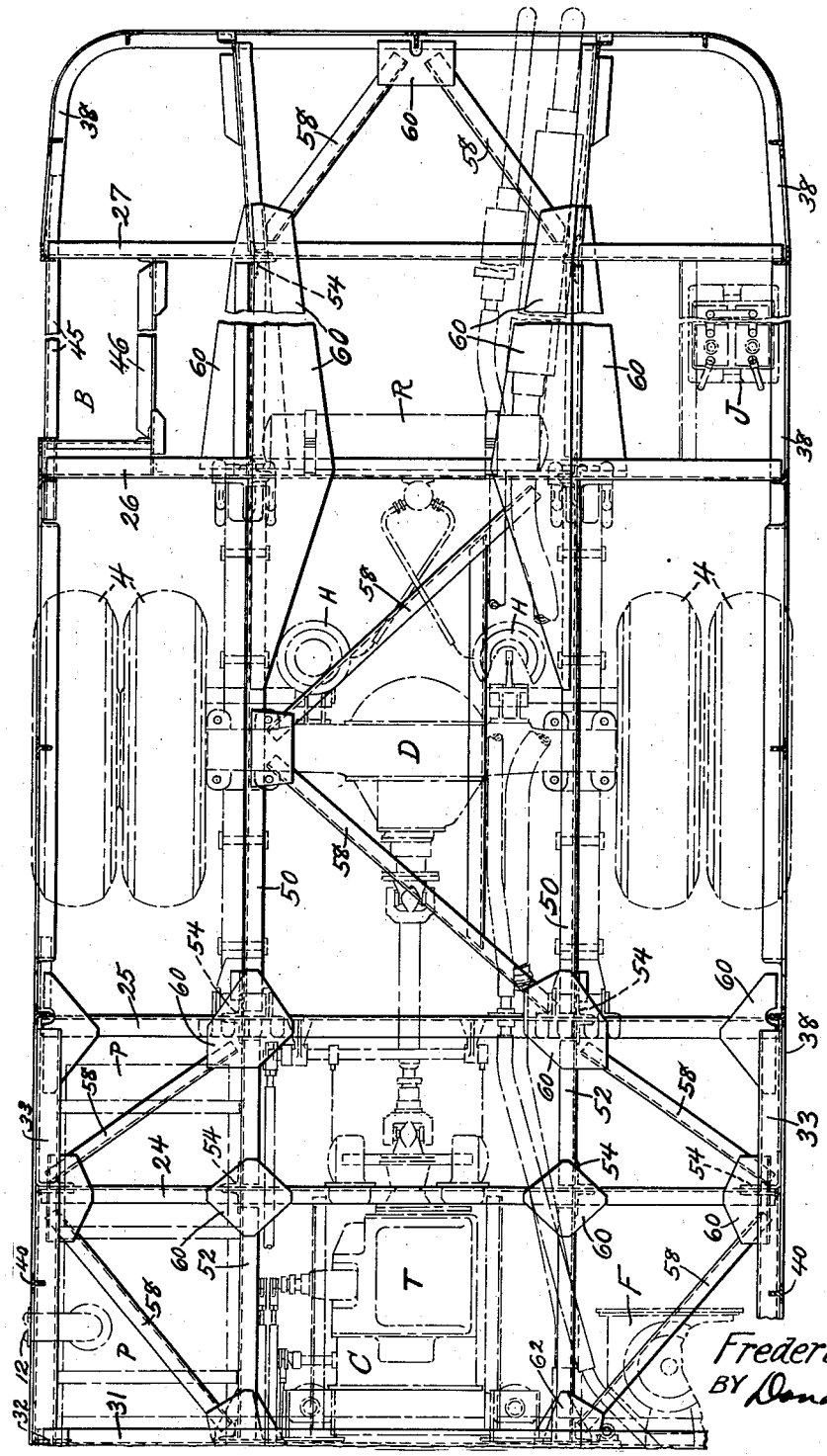

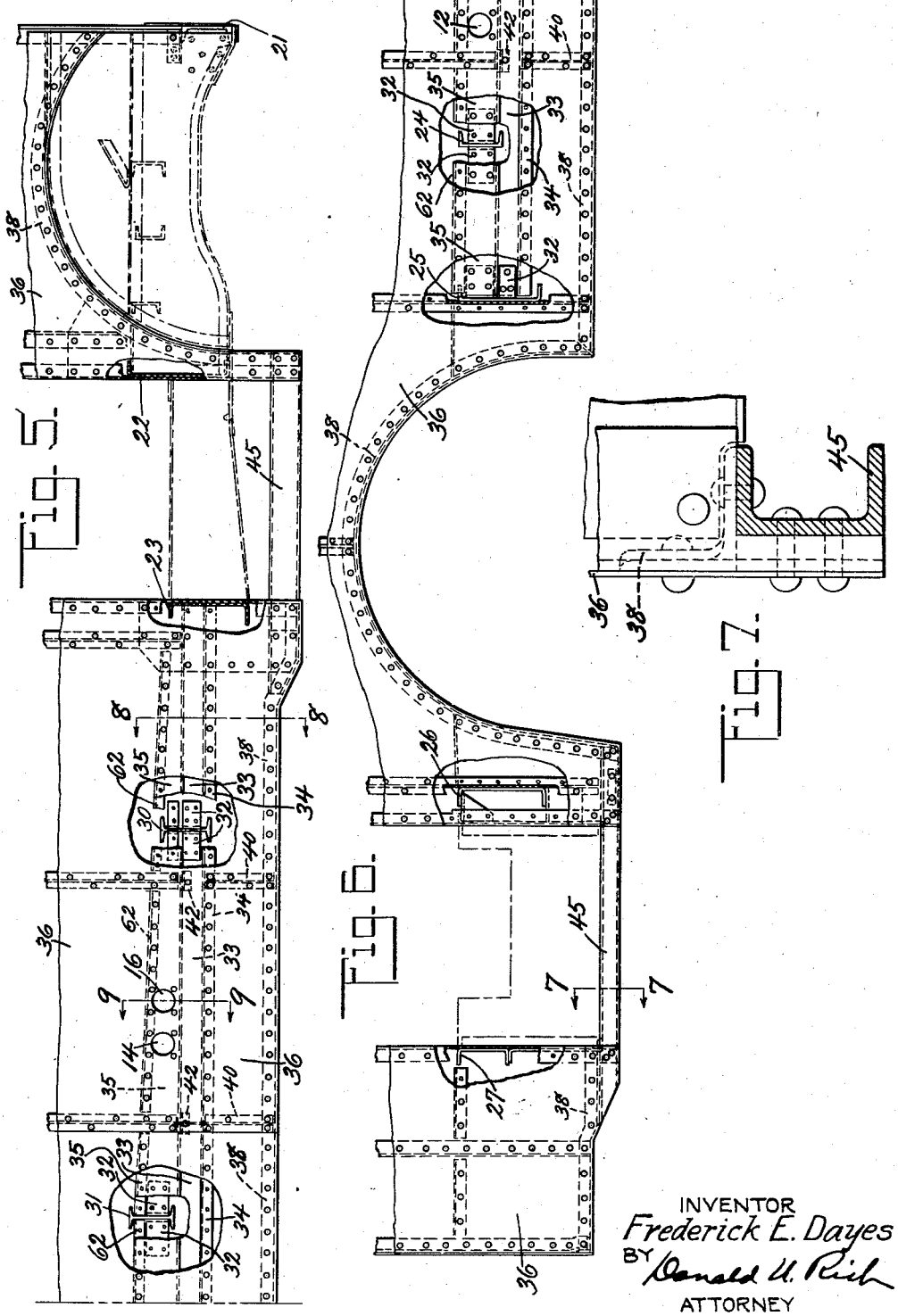

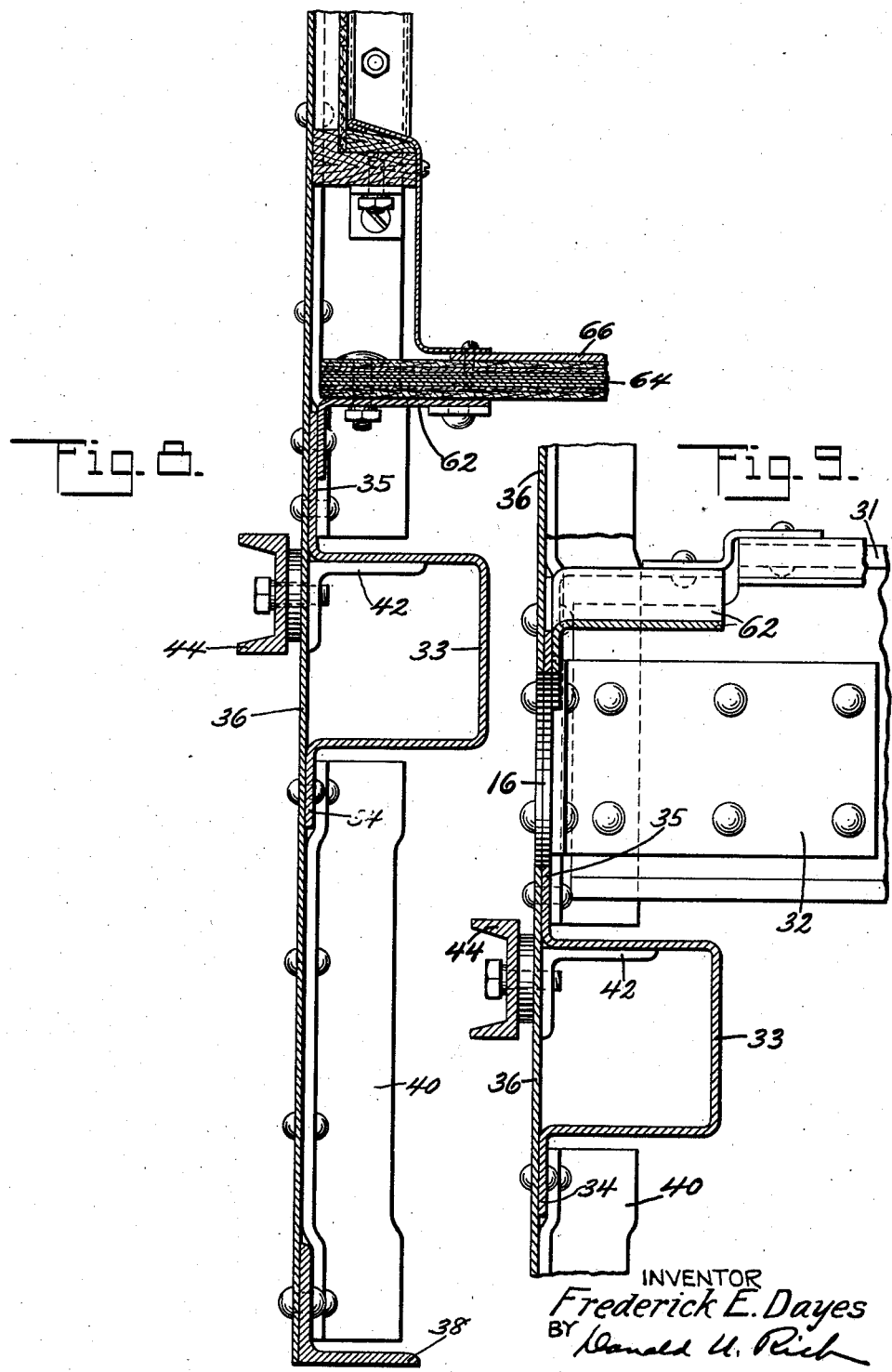

2,163,748

UNITED STATES PATENT OFFICE 2,163,748

MOTOR VEHICLE

Frederick E. Dayes, Philadelphia, Pa., assignor to American Car and Foundry Motors Company, New York, N. Y., a corporation of Delaware Application February 21, 1935, Serial No. 7,491

6 Claims. (Cl. 296—28)

The present invention relates to automotive vehicles, particularly of the passenger carrying type, whether they be of road or rail design.

Passenger carrying vehicles as heretofore constructed have had the power plant either outside the body at the front or inside the body at the front. In either case the engine is arranged in a vertical position, consuming considerable space that could be used for passengers, and so related to the passenger compartment that it is practically impossible to prevent engine odors from entering the passenger compartment.

According to this invention a special model of horizontal engine is placed beneath the floor of the vehicle at a point between the front and rear wheels and so located that when the vehicle is loaded the driving wheels will carry approximately two-thirds of the total load. The radiator is placed at the front and ventilating doors provided allowing fresh warm air to enter the vehicle if desired, thus tending to create a super-atmospheric pressure within the vehicle which will prevent any possible ingress of odors from the engine.

By disposing the engine beneath the floor of the vehicle, the center of gravity is lowered making the vehicle more stable, engine fumes are eliminated, perfect axle loading may be realized and maximum passenger space obtained for a given overall vehicle length.

Accordingly it is an object of this invention to provide a vehicle chassis so constructed as to permit the use of a horizontal engine.

A further object of this invention is the provision of a vehicle so proportioned as to obtain substantially perfect wheel loading.

A still further object of this invention is the provision of a vehicle chassis of novel construction having girder sides and transverse members.

A still further object of this invention is the provision of a vehicle having a horizontal engine beneath the floor to the rear of the front axle and having the radiator in the front of the vehicle so arranged as to permit heating of the vehicle.

A still further object of this invention is the provision of a vehicle in which substantially the entire space between bumpers is available for passengers.

These and other objects will be apparent to one skilled in the art from a study of the following description when taken in conjunction with the accompanying drawings in which:

Figure 1 is a right or curb side elevation of the passenger vehicle constructed in accordance with the present invention;

Fig. 2 is a left side elevation of the passenger vehicle;

Figs. 3 and 4 taken together show a complete plan of the vehicle chassis, the engine and other equipment being shown in phantom;

Figs. 5 and 6 taken together show a complete right side elevation of the lower portion of the vehicle, portions being broken away to more clearly show the chassis construction;

Fig. 7 is a section on line 7—7 of Fig. 6 and shows the means of carrying the girder past the door openings;

Figs. 8 and 9 are sectional views of the side construction and taken on lines 8—8 and 9—9 respectively of Fig. 5.

Referring now to the drawings in which like reference numerals refer to like parts throughout the various views; it is seen that the vehicle, in the present instance a passenger bus, is provided with the usual single tire front wheels 2, dual tire rear wheels 4, radiator 6 and bumpers 8. The lower portions of the bus sides are provided with removable plates 10 permitting access to the engine for minor adjustments and repairs. The right or curb side of the bus is provided with gas filling inlet 12, oil filler inlet 14 and oil gauge inspection hole 16, each opening being suitably covered by a hinged door or screw cap. A small door 18 is provided on the left rear side of the bus to permit of inspection and renewal of the battery. The passenger compartment extends uninterruptedly from the windshield 20 to the rear wall of the bus, the only obstructions being the front and rear wheel housings.

The base portion of the bus is formed of a plurality of continuous substantially channel shaped main transverse members 21, 22, 23, 24, 25, 26 and 27 and a plurality of continuous I-beam transverse members 30 and 31. The channels 21 and 24 and I-beams 30 and 31 are standard rolled sections since they must carry a relatively heavy load while the other transverse members are formed of pressed plate. The ends of all these transverse members or transoms are suitably connected by angle clips 32 to the side which is the main longitudinal load transmitting element and may be termed a plate girder side.

The girder side comprises in part a flanged channel pressing 33 having a constant depth lower flange 34 and a varying depth upper flange 35 to which the clips 32 previously mentioned are directly attached. The channel faces outwardly as shown in Fig. 8 and has the flanges riveted or otherwise attached to the side wall plate 36 thus forming a strong box section element or lower chord of a girder which is attached to the lower angle element 38 by the wall plate extension and by short braces or stub stakes 40. Short angle clips 42 are suitably attached within the box section at each stake portion and form attaching elements for the guard rail or side fender 44 The box shaped lower chord is so arranged as to directly support the transverse members due to their attachment and these transverse members may in turn be suitably modified, or shimmed, to have a direct bearing support on the box section independently of their attachment to the lower chord.

The flanged channel pressing 33 extends from transverse channel 25 forwardly to channel 23 on the right and to channel 22 on the left side of the bus. In order to carry the load past the front and rear door openings A and B respectively heavy channels 45 are provided forming substantially a continuation of the angle 38. The first riser 46 of the steps likewise aids materially in carrying the load past the door opening. This riser is shown only at the rear door although it is duplicated at the front door A. The plate girder is carried forwardly from channel 22 by the front wheel housing and is aided in carrying the load by the intermediate front longitudinals 48 placed directly over the front springs. The plate girder is carried to the rear from channel 25 by the rear wheel housings and is aided in carrying the load by the intermediate rear longitudinals 50 placed directly over the rear springs.

Short lengths of suitable depth channels 52 are interposed between the various transverse members to which they are suitably and rigidly attached by angle members 54. These channels 52 extend between end longitudinals 48 and 50 and serve to brace the frame, and aid in distributing the load between the transverse members. In order to accommodate the engine E it is necessary that one of the channels 52 be eliminated and the diagonally arranged channel 56 of relatively heavy section substituted. Angle members 58 extend diagonally across and brace each quadrilateral formed by the girder side, intermediate longitudinals and the transverse members. The various elements of the frame previously described are not only connected together by angle clips but also by suitably formed plates 60 riveted, welded or otherwise attached to all the elements meeting at the junction. These plates in addition to the angles 58 form diagonal bracing means for the various quadrilaterals.

It is thus seen that an extremely rigid bus is formed having plate girder sides with box section elements or lower chords extending across the portions intermediate the wheels and that these girder sides are connected by a plurality of diagonally braced quadrilaterals. From a study of the structure disclosed it is seen that any longitudinal forces will be resisted by the girder walls as well as by the intermediate longitudinals and that any laterally or angularly acting force will be resisted by the entire bus acting as a unit due to the diagonally braced quadrilaterals.

In order to support the floor and brace the transoms one leg of angle members 62 is attached to the upper edge of the variable depth flange 35 of the channel 33, the other leg being directed inwardly for attachment to the transoms substantially in alignment with the upper edge of the transoms (Figs. 5, 6) and supporting a floor panel 64 and floor covering 66. The remainder of the bus superstructure may be of conventional form although it is preferred to line the walls as set forth in my Patent 1,980,787, granted November 13, 1934.

The rigid frame has been so proportioned and designed as to permit of the placement of the engine and all auxiliaries beneath the floor of the bus and the relative position of these units will be next described.

Horizontal engine E and clutch unit C are suspended by means of rubber blocks from I-beams 30 and 31. Transmission T is supported by the channel 24 and from the transmission a short drive shaft extends to the differential D. The air storage reservoir R is attached to channel 26 and supplies air through conventional means to the brake cylinder H. Battery J is mounted on a platform carried by the channels 26 and 27 opposite the rear door. The engine manifold M has, due to its special design, two muffler equipped exhaust pipes extending therefrom to the rear of the bus and has also connected to it an air filter F of the wet type drawing air from the exterior of the bus. Mounted at the front of the horizontal engine is an air compressor K, directly driven by the engine crank-shaft, having an extension shaft to which is coupled a long shaft L carried in bearings by the channel 22 and extended forwardly to drive the conventional radiator fan by means of a V-belt. The radiator receives water from and delivers it to the engine through water pipes W. A power take off is also provided to drive the usual generator G carried by the I-beam 30. The gasoline tank P is located below channel 24 and extends between I-beam 31 and channel 25.

The peep hole 16 is provided with a door immediately adjacent which is placed a switch (not shown) which controls a light placed adjacent the float O in order that the operator may readily determine the amount of oil in the engine sump N.

While the horizontal engine has been shown as located at approximately equal distances from the front and rear axles it is to be understood that this is purely representative and that its position may be shifted as desired to obtain the proper or desired loading on the axles, also that the framing may be modified as necessary to accommodate the changed position of the units, retaining of course the strong girder sides and the braced connecting quadrilaterals, and that the scope of the invention is indicated by the appended claims rather than by the foregoing description.

What is claimed is:

1. In a vehicle, longitudinal girder supporting walls, transoms connected to said girder walls, longitudinals intermediate said walls and connecting said transoms thereby forming a plurality of quadrilaterals, at least one of said longitudinals being eliminated whereby space is provided for a horizontally disposed engine assembly, and diagonal means positioned above said engine space and connecting the adjacent transoms.

2. In a vehicle, spaced longitudinal girder supporting walls, continuous transoms connected to said girder walls, a plurality of longitudinals intermediate said walls, said longitudinals being interposed between and connecting said transoms, thereby forming a plurality of quadrilaterals within the horizontal plane of said transoms, diagonal bracing means for said quadrilaterials, at least one of said longitudinals being eliminated whereby space is provided for a horizontally disposed engine assembly, and additional diagonal bracing means positioned above said engine space and connecting adjacent transoms.

3. In a vehicle, spaced longitudinal girder supporting walls including flanged channel lower chords having upwardly and downwardly directed flanges, said plates connecting the flanges to form a box section element, continuous transoms connected to said flanged channel above the box section, a plurality of longitudinals intermediate said walls, said longitudinals being interposed between and connecting said transoms, thereby forming a plurality of quadrilaterals within the horizontal plane of said transoms, diagonal bracing means for said quadrilaterals, at least one of said longitudinals being eliminated whereby space is provided for a horizontally disposed engine assembly, and additional diagonal bracing means positioned above said engine space and connecting adjacent transoms.

4. In a vehicle, a floor, spaced longitudinal girder supporting walls including flanged channel lower chords having upwardly and downwardly directed flanges, side plates connected to the flanges to form a box section element, continuous transoms connected to said flanged channel above the box section, angle members having one leg attached to the upwardly directed flange to stiffen the same, the other leg being directed inwardly to support the floor substantially in alignment with the upper portion of the transoms, a plurality of longitudinals intermediate said walls, said longitudinals being interposed between and connecting said transoms, thereby forming a plurality of quadrilaterals within the horizontal plane of said transoms, diagonal bracing means for said quadrilaterals, at least one of said longitudinals being eliminated whereby space is provided for a horizontally disposed engine assembly, and additional diagonal bracing means positioned above said engine space and connecting adjacent transoms below the floor.

5. In a vehicle wall construction, a side girder assembly comprising a horizontal flanged channel member, the flanges of said channel member extending above and below the channel body, an angle member spaced downwardly from the lower channel flange, a plate connecting the flanges of said channel member and said angle member and forming with said channel member a box section element, vertical braces connecting the lower channel flange and spaced angle member, and floor supports connected to the upper channel flange.

6. In a vehicle, spaced longitudinal girder supporting walls, groups of closely positioned transoms connecting the walls, said groups of transoms being relatively spaced to accommodate the positioning of the vehicle power equipment, longitudinals intermediate said walls, each longitudinal being formed of sections spanning adjacent transoms and forming with the supporting walls quadrilaterals, some of which constitute power equipment confining and supporting frames, and diagonal braces for reinforcing the supporting frames.

FREDERICK E. DAYES.